(12) United States Patent
Wojack et al.

(10) Patent No.: US 8,280,459 B2
(45) Date of Patent: Oct. 2, 2012

(54) INTEGRAL HOUSING AND USER INTERFACE

(75) Inventors: Jason P Wojack, Libertyville, IL (US); Joseph L Allore, Mundelein, IL (US); Gary R Weiss, Buffalo Grove, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1018 days.

(21) Appl. No.: 12/054,828

(22) Filed: Mar. 25, 2008

(65) Prior Publication Data

US 2009/0247242 A1    Oct. 1, 2009

(51) Int. Cl.
*H04M 1/00* (2006.01)

(52) U.S. Cl. ............... 455/575.1; 455/90.3; 455/347; 455/348; 455/349

(58) Field of Classification Search ............ 455/575.1, 455/90.3, 347, 348, 349
See application file for complete search history.

(56) References Cited

U.S. PATENT DOCUMENTS

| | | |
|---|---|---|
| 3,627,935 A | 12/1971 | Spievak |
| 4,128,744 A | 12/1978 | Seeger |
| 4,160,886 A | 7/1979 | Wright et al. |
| 4,307,268 A | 12/1981 | Harper |
| 4,323,740 A | 4/1982 | Balash |
| 4,338,502 A | 7/1982 | Hashimoto et al. |
| 4,391,883 A | 7/1983 | Williamson et al. |
| 4,620,075 A | 10/1986 | LaBelle et al. |
| 4,812,831 A | 3/1989 | Laier |
| 4,843,197 A | 6/1989 | Kojima et al. |
| 5,212,356 A | 5/1993 | English |
| 5,220,521 A | 6/1993 | Kikinis |
| 5,270,702 A | 12/1993 | Krolak |
| 5,415,038 A * | 5/1995 | Rynhart et al. ............ 73/431 |
| 5,494,363 A | 2/1996 | Hochgesang |
| 5,508,124 A | 4/1996 | Gordecki et al. |
| D374,441 S | 10/1996 | Castilla et al. |
| 5,655,826 A | 8/1997 | Kouno et al. |
| 5,703,625 A | 12/1997 | Snider et al. |
| 5,797,482 A | 8/1998 | LaPointe et al. |
| 5,871,088 A | 2/1999 | Tanabe |
| 5,924,555 A | 7/1999 | Sadamori et al. |
| 5,950,808 A | 9/1999 | Tanabe et al. |
| 6,023,033 A | 2/2000 | Yagi et al. |
| D432,529 S | 10/2000 | Kolinen |
| 6,198,060 B1 | 3/2001 | Yamazaki et al. |
| 6,199,996 B1 | 3/2001 | Katrinecz, Jr. et al. |
| D443,866 S | 6/2001 | Arbisi et al. |

(Continued)

FOREIGN PATENT DOCUMENTS

DE    3736892 A1    5/1988

(Continued)

OTHER PUBLICATIONS

Patent Cooperation Treaty, "PCT Search Report and Written Opinion of the International Searching Authority" for International Application No. PCT/US2009/036263, Jan. 8, 2010, 12 pages.

(Continued)

*Primary Examiner* — Sanh Phu (57) ABSTRACT

A continuous housing (100) and integral user interface (101) is disclosed. The housing comprising a continuous housing having a cavity (117) to receive an electrical component and to surround the component on a plurality of sides. The housing further comprises, an integral user interface portion incorporated into a continuous housing portion.

15 Claims, 11 Drawing Sheets

U.S. PATENT DOCUMENTS

| | | |
|---|---|---|
| 6,263,070 B1 | 7/2001 | Kubo et al. |
| 6,305,908 B1 * | 10/2001 | Hermann et al. ............ 417/234 |
| D455,134 S | 4/2002 | Kolinen |
| D455,413 S | 4/2002 | Lee |
| 6,373,008 B1 | 4/2002 | Saito et al. |
| 6,444,928 B2 | 9/2002 | Okamoto et al. |
| 6,462,294 B2 | 10/2002 | Davidson et al. |
| 6,531,985 B1 | 3/2003 | Jones et al. |
| D474,460 S | 5/2003 | Lee et al. |
| D480,057 S | 9/2003 | Ho-Cheun et al. |
| D484,108 S | 12/2003 | Majanen |
| D488,143 S | 4/2004 | Ting et al. |
| D491,930 S | 6/2004 | Widiaman |
| 6,821,467 B2 | 11/2004 | Wolfe et al. |
| D499,720 S | 12/2004 | Majanen |
| 6,876,543 B2 | 4/2005 | Mockridge et al. |
| D504,682 S | 5/2005 | Kettula et al. |
| 6,904,300 B1 | 6/2005 | Maattanen et al. |
| 7,005,588 B2 | 2/2006 | Pihlaja |
| 7,027,036 B2 | 4/2006 | Yang |
| 7,056,042 B2 | 6/2006 | Pihlaja |
| 7,067,754 B2 | 6/2006 | Weston et al. |
| 7,070,349 B2 | 7/2006 | Dombrowski et al. |
| D526,984 S | 8/2006 | Kim et al. |
| 7,091,911 B2 | 8/2006 | Qi et al. |
| D530,697 S | 10/2006 | Wei et al. |
| D537,075 S | 2/2007 | Helin |
| D538,276 S | 3/2007 | Wang |
| 7,193,581 B2 | 3/2007 | Tyler et al. |
| 7,200,009 B2 | 4/2007 | Narhi et al. |
| 7,271,769 B2 | 9/2007 | Asano et al. |
| 7,330,743 B2 | 2/2008 | Hutchison et al. |
| 7,404,682 B2 | 7/2008 | Dombrowski et al. |
| 7,668,576 B2 * | 2/2010 | Ellenbogen et al. ........ 455/575.1 |
| 2002/0025837 A1 | 2/2002 | Levy |
| 2002/0066660 A1 | 6/2002 | Ardrey et al. |
| 2002/0190875 A1 | 12/2002 | Hentunen |
| 2003/0068035 A1 * | 4/2003 | Pirila et al. .................... 379/447 |
| 2003/0100275 A1 | 5/2003 | Hsu et al. |
| 2004/0031673 A1 | 2/2004 | Levy |
| 2004/0102232 A1 | 5/2004 | Nuovo |
| 2004/0114341 A1 | 6/2004 | Ono et al. |
| 2004/0233645 A1 | 11/2004 | Chen |
| 2005/0243506 A1 | 11/2005 | Robertson et al. |
| 2006/0268528 A1 | 11/2006 | Zadesky et al. |
| 2007/0236870 A1 | 10/2007 | Hachino et al. |
| 2007/0265028 A1 | 11/2007 | Jorgensen |

FOREIGN PATENT DOCUMENTS

| | | |
|---|---|---|
| DE | 3816182 A1 | 11/1989 |
| DE | 9415289 U1 | 4/1995 |
| EP | 1017076 A2 | 7/2000 |
| EP | 1035557 A2 | 9/2000 |
| EP | 0818793 B1 | 12/2002 |
| EP | 0847066 B1 | 10/2003 |
| GB | 2354738 A | 4/2001 |
| JP | 09093324 A | 4/1997 |
| JP | 09106729 A | 4/1997 |
| JP | 09325843 A | 12/1997 |
| JP | 10241483 A | 9/1998 |
| JP | 10283096 | 10/1998 |
| JP | 11213792 | 8/1999 |
| JP | 11250758 A | 9/1999 |
| JP | 2002203444 A | 3/2004 |
| JP | 2004079338 A | 3/2004 |
| JP | 2000067693 A | 10/2007 |
| KR | 100528794 B1 | 11/2005 |
| KR | 1020050119962 | 12/2005 |
| KR | 100546965 B1 | 1/2006 |
| KR | 100652639 B1 | 11/2006 |
| WO | 9965547 A1 | 12/1999 |
| WO | 0012931 A1 | 3/2000 |
| WO | 2005125158 A1 | 12/2005 |
| WO | 2007110771 A2 | 10/2007 |

OTHER PUBLICATIONS

Rogers Corp. In Full Scale Production of DFLX Lamps Its Newest Electroluminescent (EL) Product Through an Exclusive, Worldwide Licensing Agreement; 2 Pages; Feb. 20, 2004; http://www.rogers-corp.com/dflxlamps.htm.

Durel Introduces New DFLX Durel Flexible Electroluminescent Lamp for High-Quality Keypad Lighting; Jul. 7, 2003; 2 Pages; http://www.rogers-corp.com/dflx.htm.

Bob Hetherington; "Philips iPronto Remote Control"; 3 Pages; Oct. 2003, www.hometoys.com/htinews/oct03/reviews/ipronto/ipronto.htm.

EPO Exam Report; counterpart Application No. 05754321.7-1527; Jul. 1, 2009; 5 pages.

I-mate SPL, Announced Sep. 2006, <URL:www.gsmarena.com>, Retrieved From Internet Sep. 28, 2007.

Amoi, A675, Announced 2Q 2006, <URL:www.gsmarena.com>, Retreived From Internet Sep. 28, 2007.

* cited by examiner

INTEGRAL HOUSING AND USER INTERFACE

FIELD OF THE INVENTION

The present invention relates generally to electronics device housings including user interfaces, and more particularly, to a continuous housing having an integrated user interface formed therein.

BACKGROUND OF THE INVENTION

Electronics devices generally have a housing and electronic components retained therein. Some devices have multiple housings pieces coupled together while others are a single housing. User interfaces are accessible through some portion of the housing. Where a housing is comprised of multiple portions, there are typically two or more portions, halves for example, that are put together to contain electronics. The housing provides structure to retain and protect the components. User interfaces protrude through an opening in the housing such that it is accessible to the user.

In one example an extrusion is used as the housing, the extrusion having a rectangular shape that has openings at the top and bottom, in the short dimension, and the user interface protrudes through an opening in the housing.

Multiple housing portions require multiple assembly steps, thereby increasing complexity and cost. As a result, a housing, which simplifies manufacturability while maintaining structural and esthetic characteristics, would be beneficial.

DETAILED DESCRIPTION OF THE DRAWINGS

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
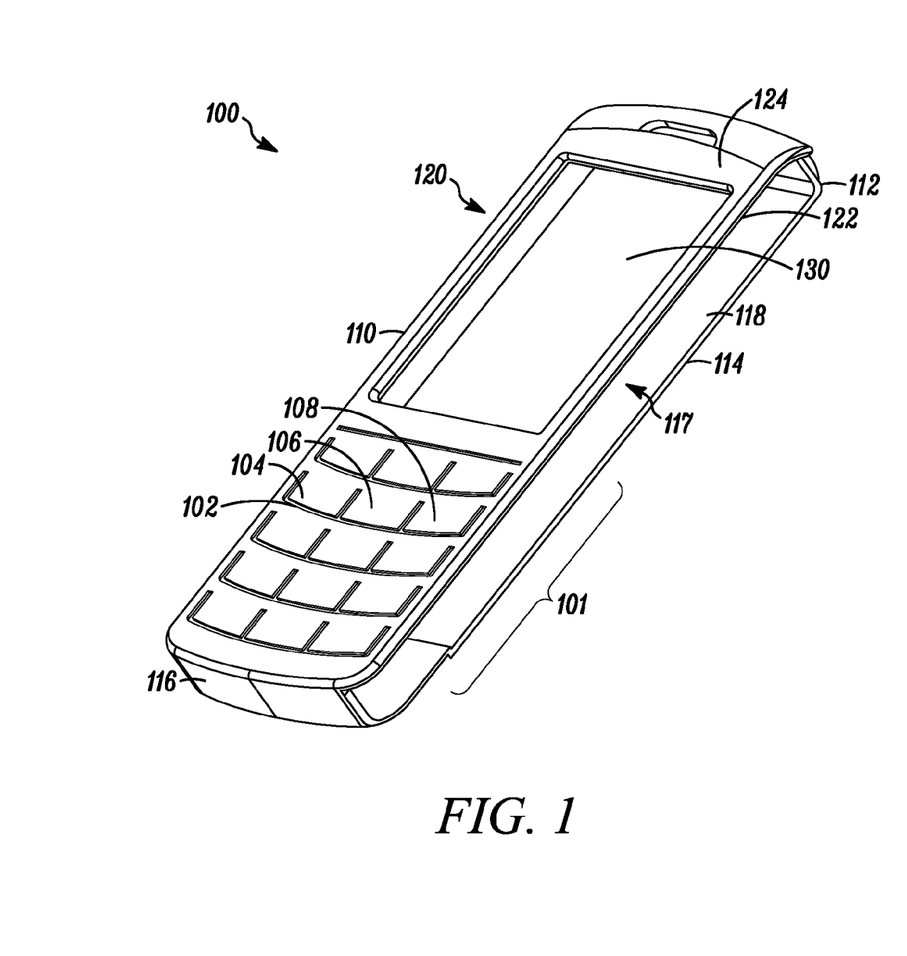
FIG. 1 illustrates a single piece continuous housing and integral user interface.

FIG. 1 illustrates an exemplary single piece continuous housing 100 in the form of a wireless communication device having an integral user interface 101. The single piece continuous housing 100 and integral user interface comprises contiguous encompassing surfaces to enclose/surround electrical components on a plurality of sides. The integral user interface 101 is comprised of isolated portions of the continuous housing 100 such that the keys of the user interface are integrated into the housing. The integral user interface 101 comprises functional user interface portions formed into the housing 100 by removing material from the continuous housing 100. In one embodiment, the integral user interface 101 is an integral key top 104 formed into the continuous housing 100 and at least partially isolated from adjacent housing 100 material. The key top 104, in this embodiment, is formed by creating a void 102 in the material of the continuous housing 100. The void 102 creates the key top shape and allows that portion of the continuous housing 100 to deflect relative to adjacent areas of the housing 100 functioning as a button.

In this embodiment, the portion of the key 104 deflects substantially perpendicular to the surface of the continuous housing 100 such that the movement of the key is localized to the key 104 portion of the housing 100. In this embodiment, a plurality of keys are formed by a plurality of voids. A single continuous void 102 may form a single key or alternatively, as in this embodiment, a plurality of keys; for example, in this embodiment, the void 102 defines three keys, the first key 104 a second key 106 and a third key 108.

The continuous housing 100 in this embodiment has four contiguous (adjoining) sides that form the continuous housing 100; a first side 110; a second side 112; a third side 114; and a fourth side 116. The continuous housing sides form a a cavity 117. In this embodiment the housing includes four sides however it is to be understood that there may be a plurality of sides (i.e. two or more sides) one or more having integral user interface portions. For example, the housing may have two sides that meet at a point to form the enclosure, i.e. a front and a back only. In another embodiment the enclosure may have five sides such as a "punch through" extrusion. The sides may be flat or they may be non planar or a combination thereof giving the housing enclosure a variable contour.

Further, the housing 100 comprises a first cavity opening 118 and a second cavity opening 120 the second opening 120 is distal to the first opening 118. In this embodiment, the housing 100 is formed from an extrusion element; the extrusion element having the four sides and a hollow profile with a cavity 117 partially enclosed by the sides. The cavity openings 118, 120 are formed as part of the extrusion process. Each side has an outer portion and an inner portion. The first side 110 has a first side outer portion 1124 and a first side inner portion 122. The first side outer portion 124 accessible from the outside of the device (may also be referenced as a first face); the first side inner portion 122 accessible from the cavity 117. The continuous housing forms a continuous hollow profile.

Figure 2:
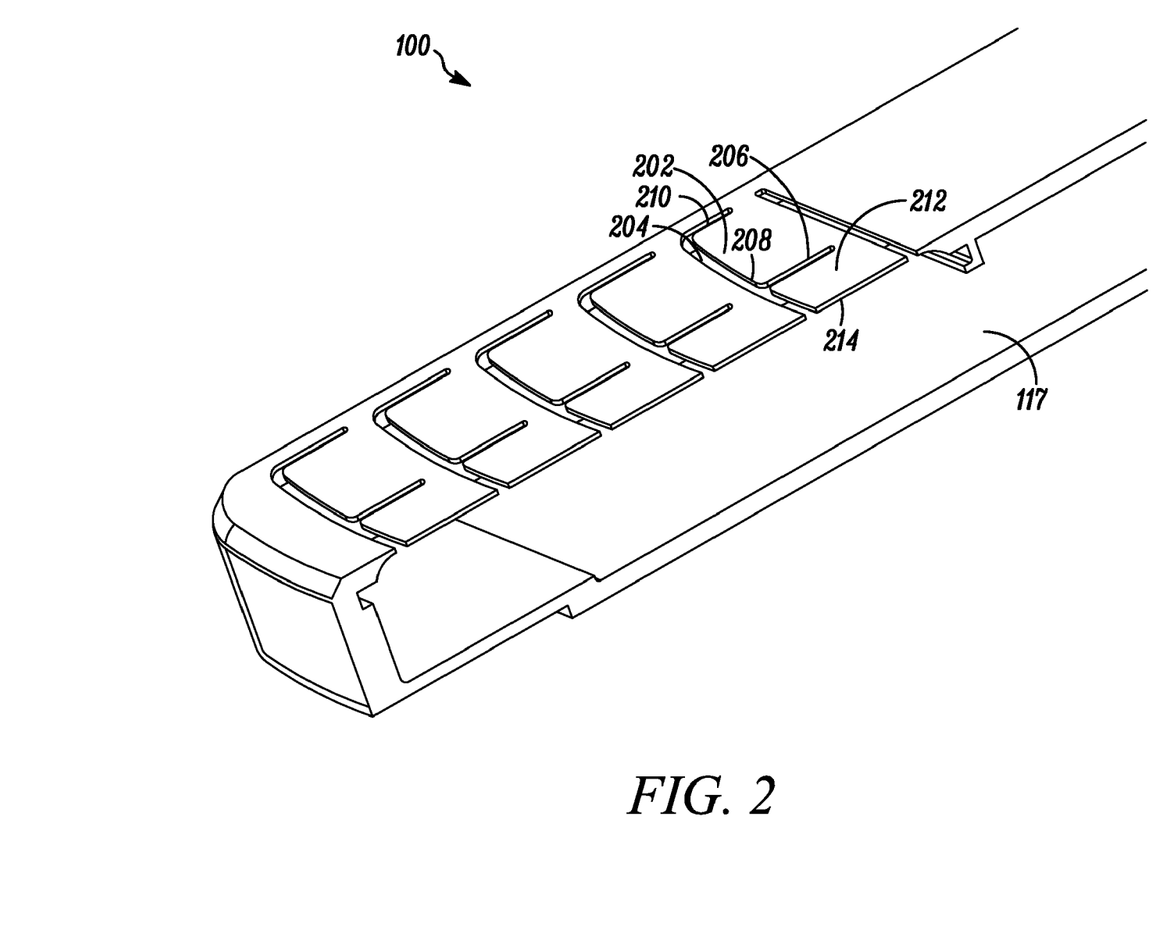
FIG. 2. illustrates a cross section of a deflectable housing portion, that operates as a user interface component.

FIG. 2 illustrates a cross section of a continuous housing integral user interface 101. The integral user interface 101 comprises at least one deflectable housing portion 202 that operates as an integral user interface component which may also be called a key top. In this embodiment, a void 204 is formed into the continuous housing 100 material, the void 204 having a void shape wherein the void shape defines the shape of the deflectable housing portion 202. For example, the void 204 forms three sides of the first deflectable housing portion 202, which is a key top portion of a user interface; a first key top side 206, a second key top side 208 and a third key top side 210. The void 204 may be a slot that defines one integral key top or a plurality of integral key top as shown in FIG. 2. The void 204 may be a series of holes that provide relief and allow the adjacent portion to deform.

In one embodiment the material is removed by a laser etching process. In another embodiment the material is removed by a CNC machining process. In this embodiment the continuous housing is formed by an extrusion process and the voids are formed secondary to the extrusion process. It is known to those of ordinary skill in the art that a plurality of mechanical operations may be used for the remove of material.

The key top is defined by the voids and has a key top outer surface that is on the outward side of the housing 100 and a key top inner surface on the inside of the housing 100 adjacent to the cavity 117. The inner surface is coupled to a switch on a circuit board (FIG. 6) such that when the outer surface 212 of the key top is pressed downward, the inner surface 214 of the key top activates the switch. Indicia may be formed as included with the key top such as alphanumeric characters or icons.

Figure 3:
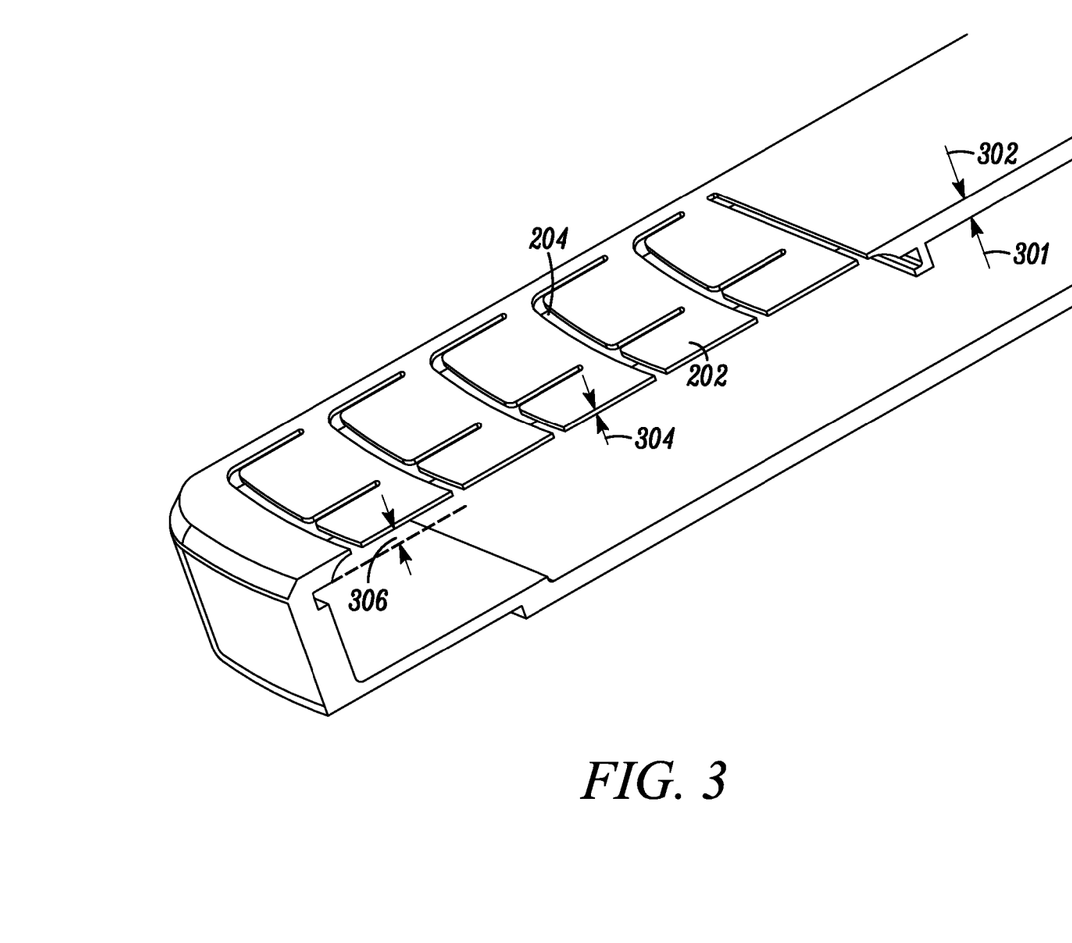
FIG. 3 illustrates a cross section of a deflectable housing portion, that operates as a user interface component.

FIG. 3 illustrates a cross section of a continuous housing integral user interface 101. In this embodiment, key material is thinned on the inner surface 301 relative to other portions of the continuous housing. In this embodiment, the thinning of the key material is in addition to the void 204 that forms the shape of the key 202. This allows the material of the key top 202 to deflect in a direction substantially perpendicular to the plane of the surface of the material in a cantilevered motion. The thinning of the key provides greater relief and allows the key to defect more easily. The thickness 304 of the key can be adjusted to achieve the desired spring constant and thereby the feel to the user as the key top is depressed. The un-thinned thicker portions 306 of the continuous housing 102 provide structural strength to the housing and the thinning of the keys allow the keys to deflect. The thickness of one key may be greater or less than another key. In one embodiment the entire integral user interface area has a reduced thickness. In another embodiment, each key has a portion that is selectively thinned, such that the key thickness varies across portions of the key. The thickness may vary relative to the location of integral user interface area. For example, keys that are close to the edge of the housing may be thicker. The portions along the edge of the housing adjacent to the cavity openings may also be thicker than the key top portion to provide structural integrity to the housing potion.

Figure 4:
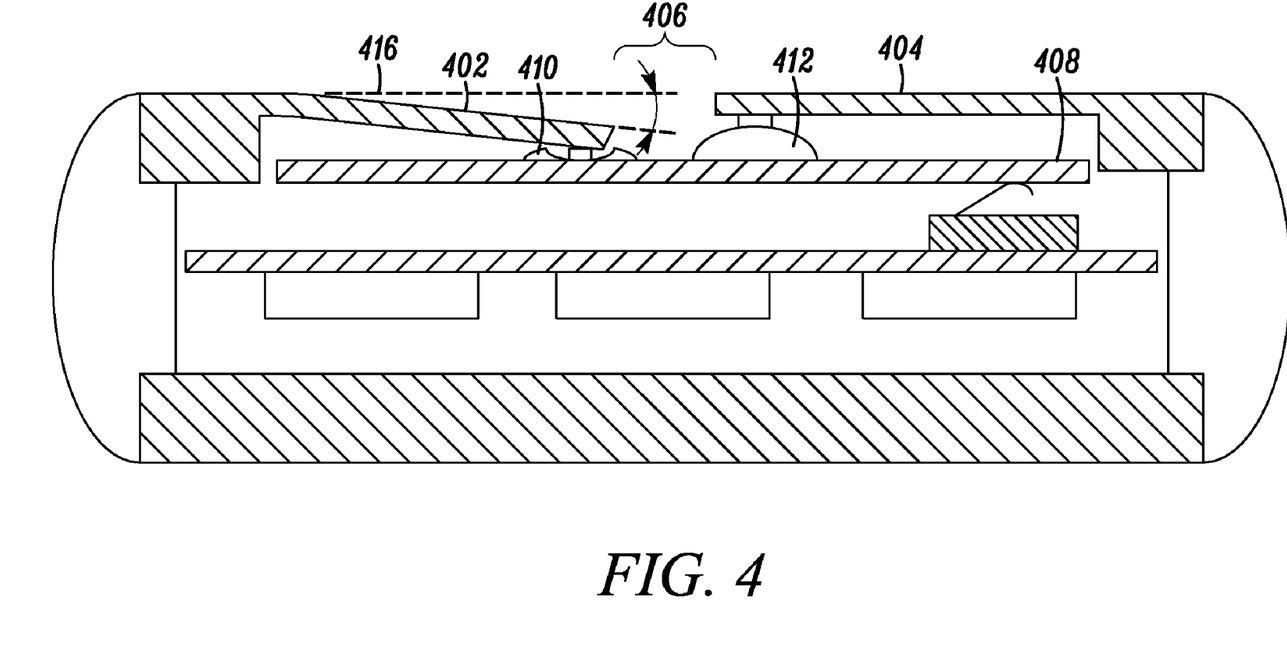
FIG. 4 illustrates a deflectable housing portion, that operates as a user interface component.

FIG. 4 illustrates a cross section of a deflectable housing portion that operates as a user interface component. The deflection of the key is illustrated here. A first key 402 (deflected key) and a second key 404 are shown; the first key 402 is deflected as if it were depressed by user actuation (user not shown). The cross section illustrates the two keys separated by a void 406. A keyboard printed circuit board (PCB) 408 is configured below the keys, 402, 404 and include a switch for each key (not shown) and corresponding domes or poppels; a first dome 410 and a second dome 412. The first key 402 is deflected away from the housing surface plane 416 and deforms the adjacent first dome 408 to activate the switch, which is adjacent to the first dome 408. The second dome 410 is not deformed and in a state of rest, adjacent to the second key 404 which is not deflected. The deflection motion of a key is the result of void and localized continuous housing material thickness configurations. The keyboard PCB 408 is electrically coupled to a electrical component enclosed in the cavity 117 by a connector 412. The electronic component is circuitry for wireless communication device for example. In another embodiment, the electronic component may be for a computer, electronic game, navigation device or the like.

Figure 5:
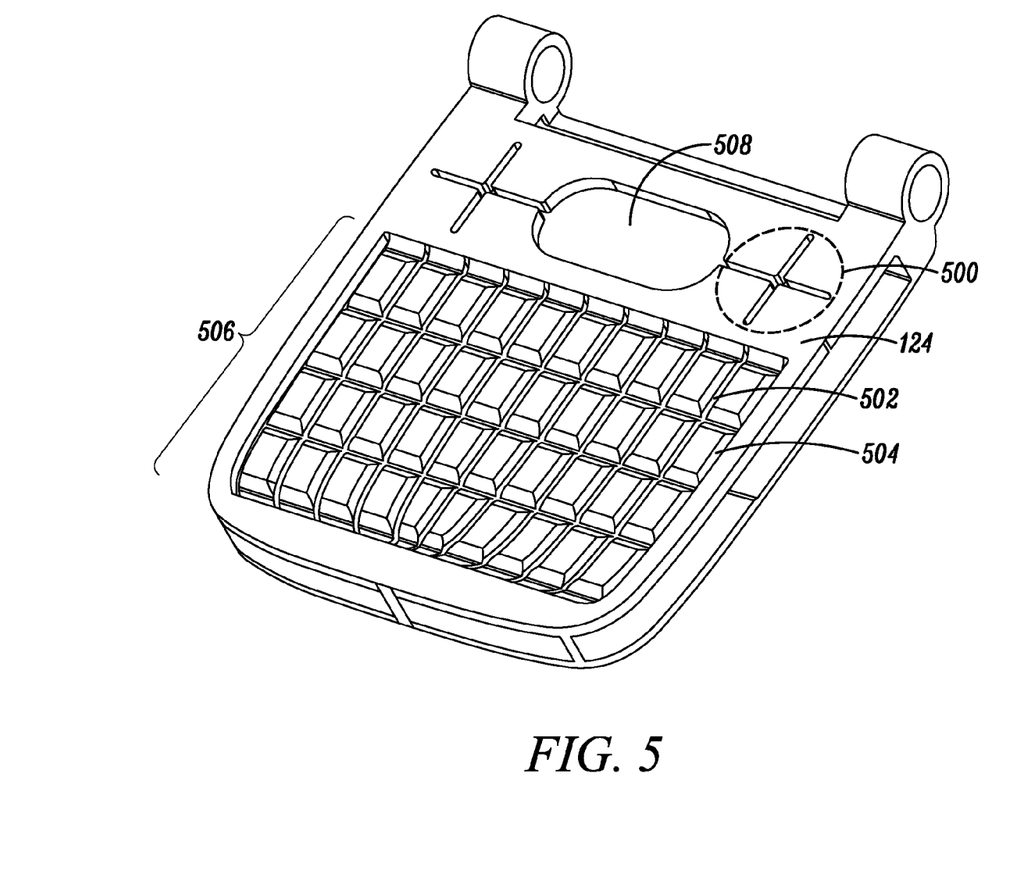
FIG. 5 illustrates a deflectable housing portion, that operates as a user interface.

FIG. 5 illustrates an integral user interface wherein the keys are integrated into the housing by a combination of voids 502 in the housing material and removing material from the first side outer portion 124 to provide a shaped key surface 504. The removed material defines the shapes of the keys and the overall integral user interface. The voids 502 allow the keys to cantilever and deflect in order to actuate the switch. In one embodiment the integral user interface comprises cantilever keys only. In another embodiment, the integral user interface is a combination of integral user interface 506 and through-hole user interface access 508 that accepts a non-integral user interface component. The access, which is a void in this embodiment, allows the non-integral user interface to protrude through the housing. The non-integral user interface is a complete user interface and is not integral to the continuous housing. The user makes direct contact with the non-integral user interface that protrudes through the continuous housing.

Figure 6:
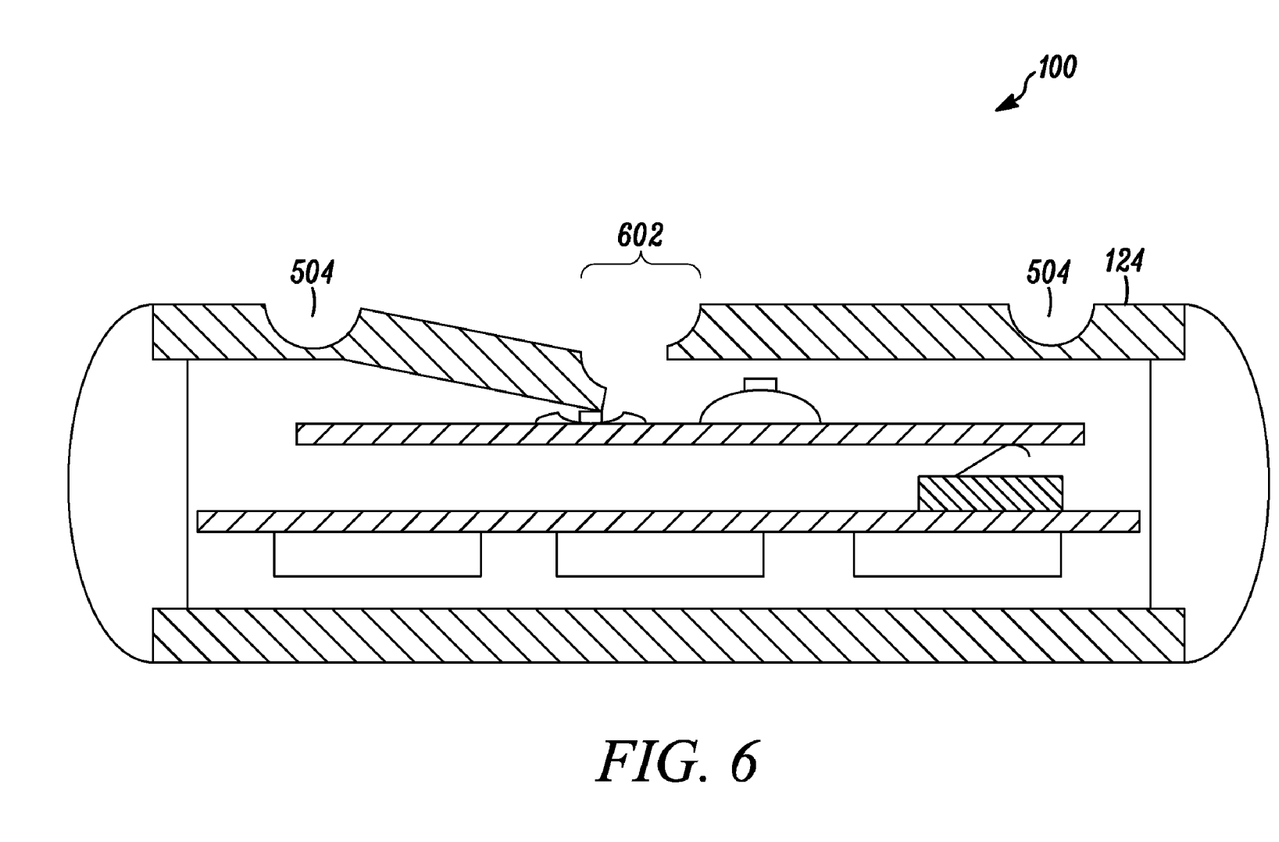
FIG. 6 illustrates a keypad assembly prior to assembly into the continuous housing.

FIG. 6 illustrates a cross section of a portion of an integral keypad formed in the housing by a void and top-thinned 3D shaping of the keys. In this embodiment a void 602 is formed into the continuous housing 100 and the outer surface 124 of the integral user interface 101 is shaped by removing or thinning the continuous housing material. The material is removed to define the individual keys of the integral user interface and provide the keys with a three dimensional shape. The three dimensional shape provides passive tactile feed back as well as an esthetically pleasing look. The passive tactile feedback provides a discernable feel to distinguish individual integral keys of the user interface from one another. Active feedback such as poppels, dome switches, haptics and the like may also be provided via the individual integral keys of the user interaction.

Figure 7:
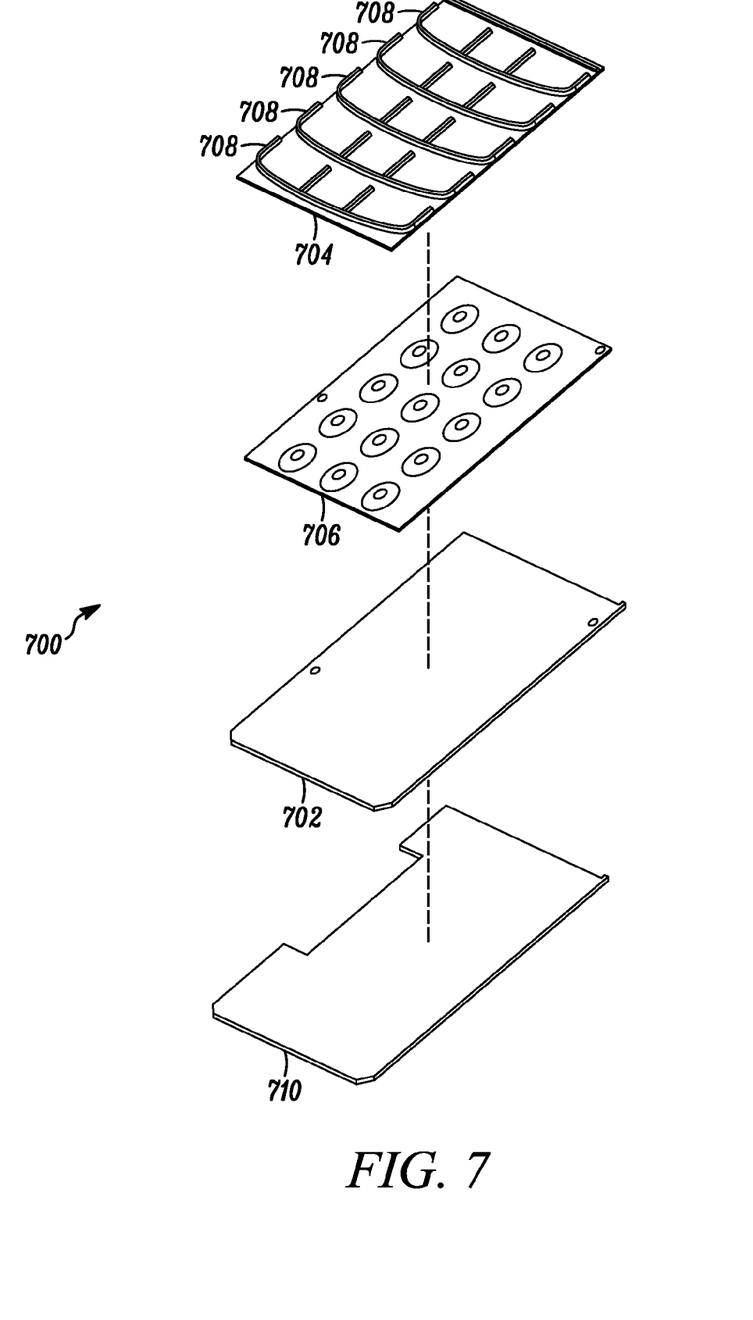
FIG. 7 illustrates a keypad assembly assembled into a continuous housing.

In FIG. 7, a keypad sub-assembly 700 is illustrated prior to assembly into the housing. The keypad 700 comprises a keypad printed circuit board (PCB) 702 and a keypad backfill 704. The keypad PCB 702 comprises one or more dome switches 706 (also known as poppels) that provide tactile feedback of key top actuation. The keypad sub-assembly 700 may have a plurality of dome switches that align with and are configured adjacent to the integral keys 104 formed into the housing 100 when the sub assembly is configured in the housing cavity 117. Under the dome is a switch 706 on the PCB 702 that is closed when the dome is depressed and contacting the switch. The keys 104 of the integral user interface 101 are aligned adjacently once the keypad sub-assembly is inserted into the housing 100. The integral key tops 104, when pushed, depress the domes to activate the switch.

The keypad back-fill 704 is configured between the key tops 104, 106, 108, 202 . . . of the integral user interface 101 and the keypad PCB. In one embodiment the keypad backfill 704 portion comprises a void filler portion 708. The void filler portion 708 extends into the void 102 and between a plurality of key tops or between a key top and adjacent continuous housing portions. The backfill 708 may be transparent to function as a light guide, to illuminate the backfill void filler portions and may transmit light to indicia formed into the key tops. The keypad backfill 704 is configured between the integral user interface inner surface 122 and the dome switch portion 706 of the keypad PCB 702.

In one embodiment the keypad PCB 702 comprises an illumination source that illuminates the key, icons of the keys, or the keypad backfill, which may transmit the light thereto. In this embodiment the illumination provides a backlight to the keypad features (such as the indicia of the key tops and a transparent keypad back-fill). The illumination source, in this embodiment is a layer between the dome switch 706 and the PCB 702. In one embodiment the illumination source is an electroluminescent panel (EL) attached to the dome switch 706 layer. In another embodiment the illumination source is an LED or plurality of LED's to create the backlighting. It is understood that keypad sub-assemblies, methods of providing a key switch, illumination, tactile feedback and the like are known to those of ordinary skill in the art.

In this embodiment, a keypad wedge 710 is provided and configured such that it is adjacent to the bottom side of the keypad PCB 702, the side opposite to the dome switches. The keypad wedge 710 is a stiffener to counteract the force of the key top depression during actuation. The keypad wedge 710 in this embodiment may also serve to shift the keypad subassembly 700 into place adjacent to the inner surface 122 of the integral user interface 101, aligning the individual keys with the dome switches of the keypad PCB. The wedge 710 shifts the keypad PCB 702 and the keypad back fill 704 in the z-axis toward the inner surface 122 of the housing 100. A keypad wedge 710 may or may not be present. For example, the PCB 702 may act as a stiffener and z-axis insertion element as the keypad thickness may provide sufficient strength in place of the wedge.

In another embodiment, the keypad sub-assembly includes touch sensors. The touch sensors sense the touching of the individual key tops of the integral user interface 101. The key tops 104, 106, 108 in this embodiment need not deflect; the key top shapes are defined by the voids and the three dimensional shaping of the outer surface of the key tops.

Figure 8:
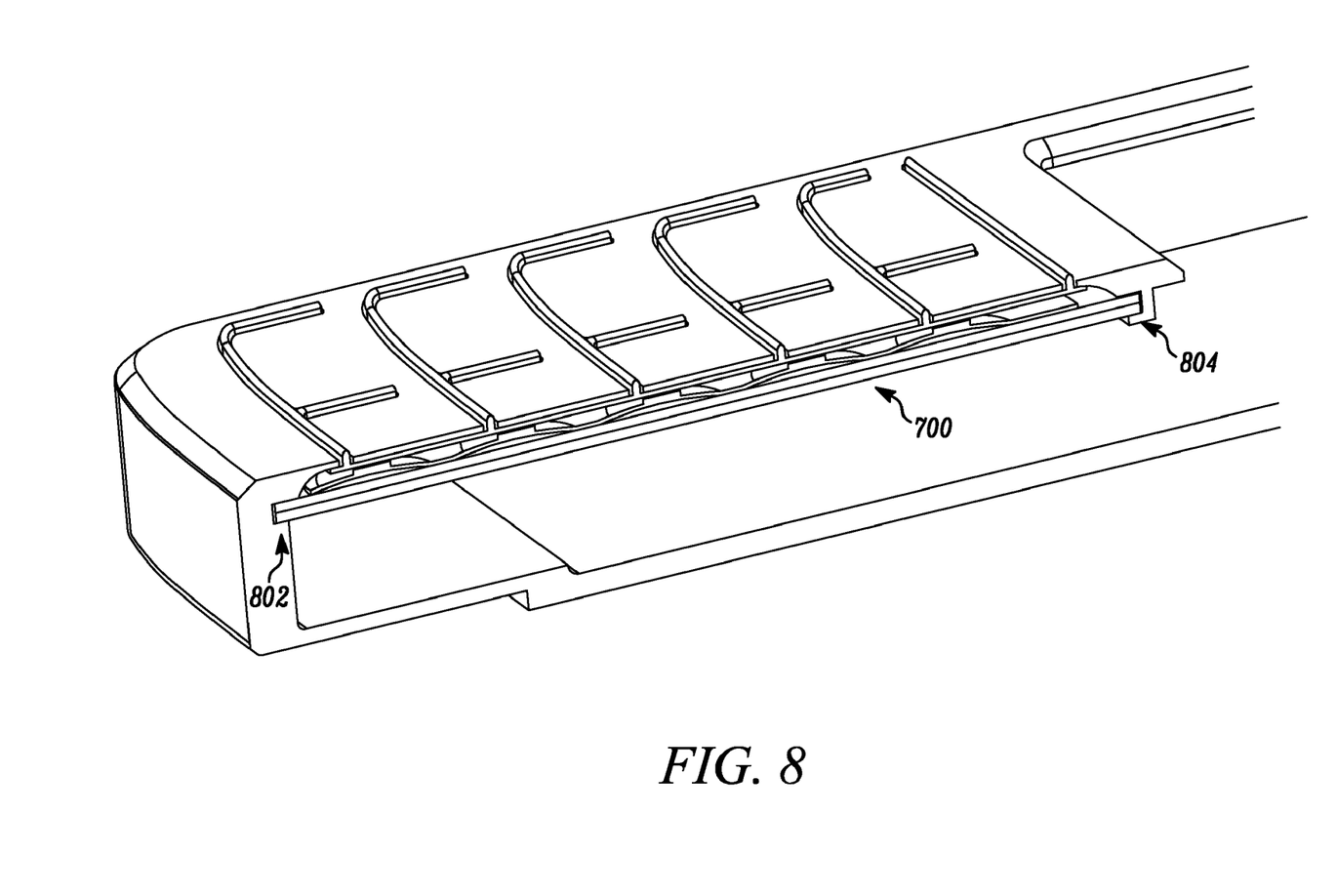
FIG. 8 illustrates a continuous housing with a integral user interface and keypad sub assembly.

FIG. 8 illustrates the keypad sub-assembly 700 inserted into the housing 100. The housing 100 in this embodiment has integral rails 802 to accept the PCB sub-assembly 700. The rails 802 allow the keypad sub-assembly to be slid into the housing from the side via the housing cavity opening 118 or cavity opening 120 in this embodiment. In one embodiment, wherein the housing is an extruded housing element, the rails 802 are extruded into the housing 100 a part of the extrusion process. The rails 802 run in the direction of the extrusion such that the keyboard is inserted into the cavity opening 118, 120.

Figure 9:
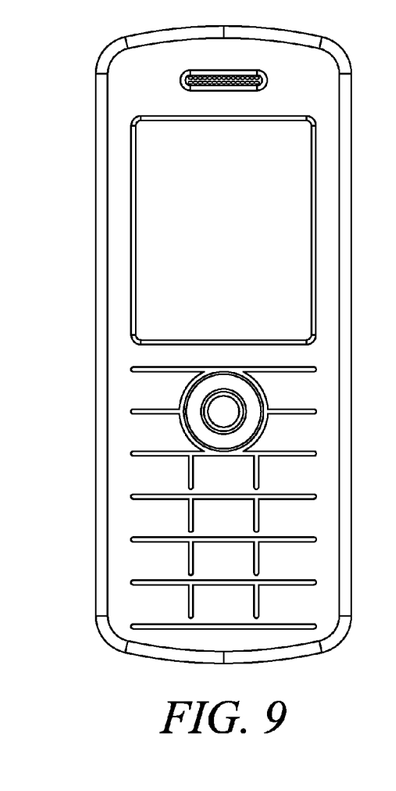
FIG. 9 illustrates a continuous housing with a integral user interface.
Figure 10:
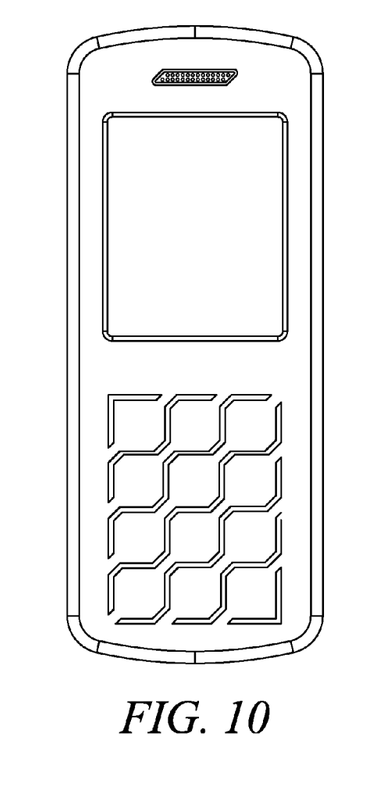
FIG. 10 illustrates a continuous housing with a integral user interface.
Figure 11:
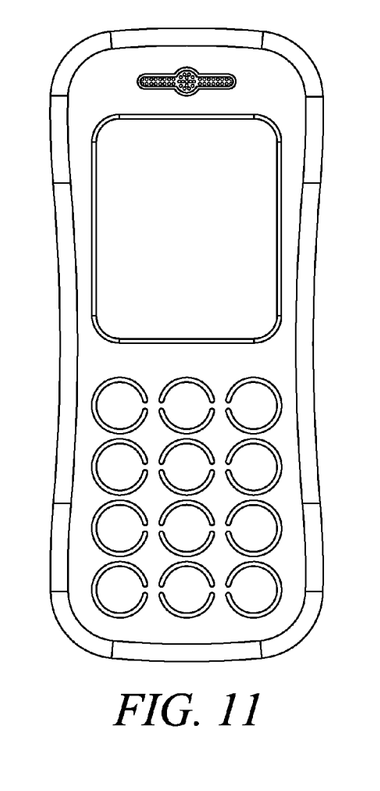
FIG. 11 illustrates a continuous housing with a integral user interface.

Referring to FIG. 9 through FIG. 11; the voids may be configured into the continuous housing 100 to provide a plurality of key top shapes giving different esthetic looks to the device. FIG. 9 illustrates one embodiment of the continuous housing with an alternative integral keypad 900 configuration. FIG. 10 illustrates another embodiment of the continuous housing with a first alternative integral keypad 1000 configuration. FIG. 11 illustrates another embodiment of the continuous housing with a first alternative integral keypad 1100 configuration. In FIG. 10 and FIG. 11, the different key top shapes all align with the dome switches of the underlying keypad sub assembly. In these embodiments one keypad subassembly is manufactured and accommodates a plurality of integral user interface looks.

Figure 12:
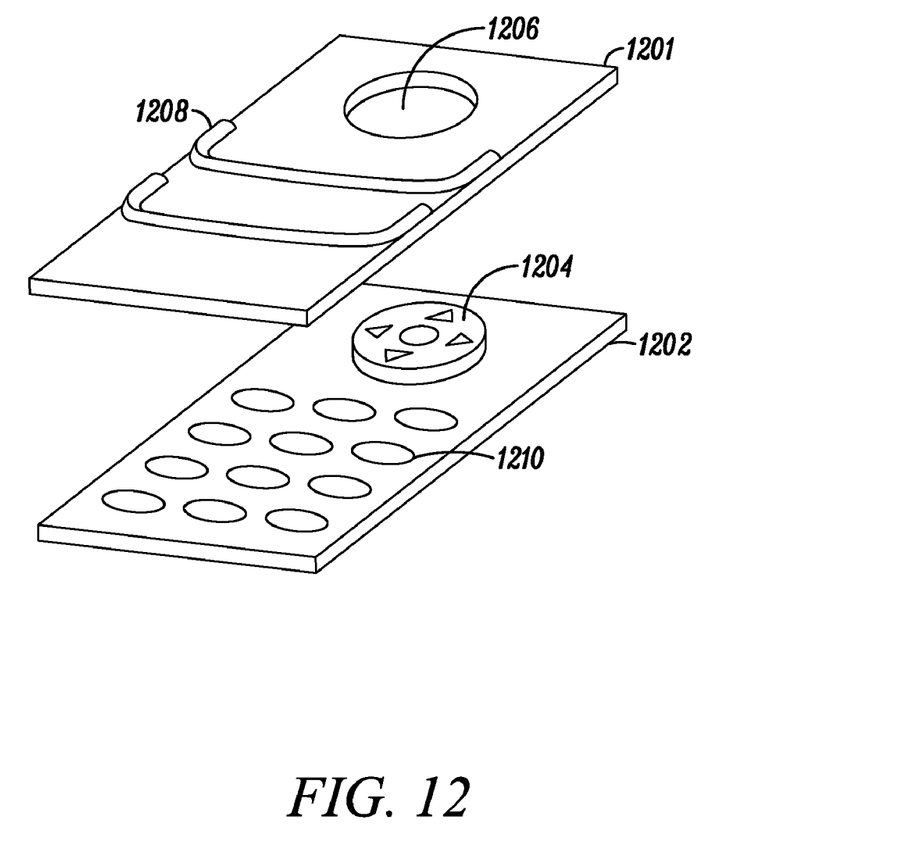
FIG. 12 illustrates an integral and non-integral user interface combination.

FIG. 12 illustrates a keypad backfill and sub assembly portion 1202 with a non-integral user interface portion 1204. The keypad subassembly portion 1202 aligns with both an integral user interface portion 1201 of a device user interface while the non-integral user interface portion 1204 protrudes though a non-integral user interface access of the continuous housing 100. In this embodiment a non integral key top portion is coupled directly to the keypad subassembly as a discrete user interface portion. The key tops of the integral user interface portion remain integral to the continuous housing. In one embodiment the voids of the integral user interface and the non-integral user interface access are coupled together. For example, referring back to FIG. 5, a portion of the void 506 that forms an integral user interface portion also forms a non-integral user interface access 508 portion. In this embodiment, the integral user interface and the non-integral user interface are adjacent and utilize portions of a single void shape of void 508. In another embodiment the voids of the integral user interface and the non-integral user interface access are independent.

Figure 13:
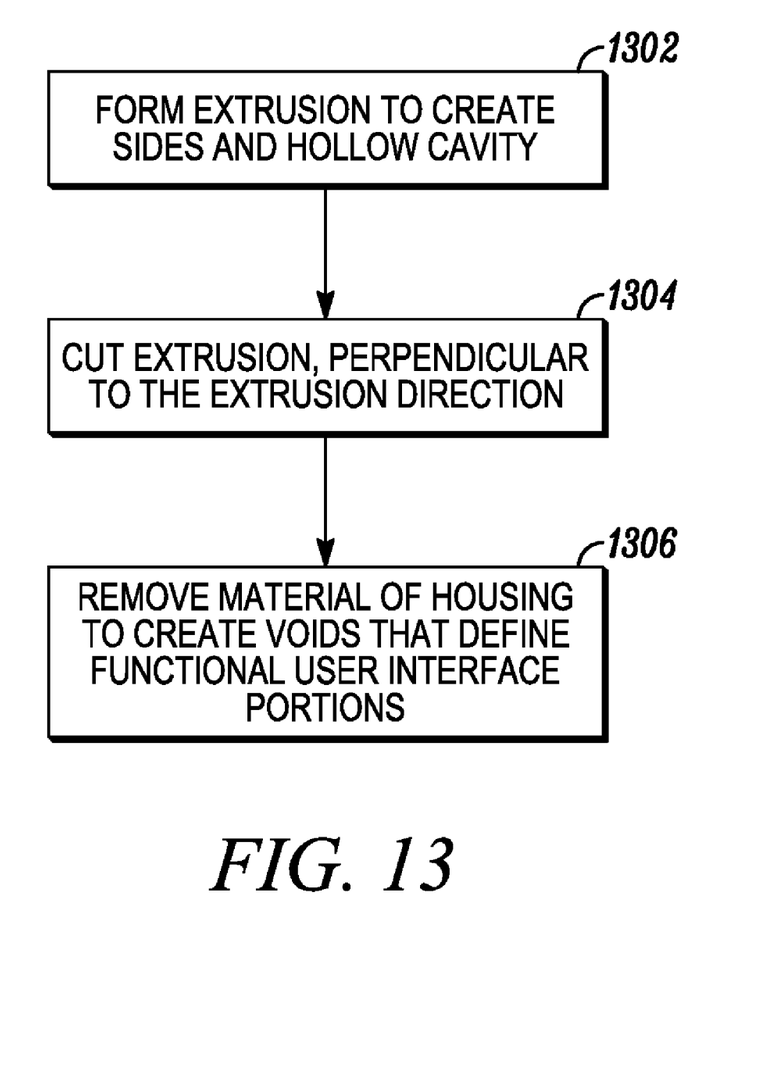
FIG. 13 illustrates a method of forming a continuous housing and integral user interface.

FIG. 13 illustrates an exemplary process for forming the continuous housing and integral user interface. The process provides forming 1302 an extrusion wherein the extrusion has at least four continuous sides, an extrusion cavity and two extrusion defined openings. In one embodiment, at least one of the sides is extruded to include a thicker wall, such as a top or the bottom walls. The process also included cutting 1304 the extrusion at a predefined width along the direction of the extrusion. The process further includes removing 1306 material to shape and define functional integral user interface portions, including forming the voids; selectively thinning portion s of the integral user interface portions and the like. During the extrusion process, features such as rails are formed into the extrusion. One extrusion cavity may be formed or a plurality of cavities may be formed.

What is claimed is:

1. The continuous housing and integral user interface comprising:
 a continuous housing having a cavity to receive an electrical component and surround the components on a plurality of sides, the continuous housing including a rail, configured to receive a keypad subassembly;
 an integral user interface portion incorporated into the continuous housing portion; and
 the keypad subassembly configured in the cavity to align adjacent to the integral user interface portion, the keypad subassembly including a keypad backfill portion; a keypad printed circuit board configured adjacent to the keypad backfill portion; and a keypad wedge configured adjacent to the keypad printed circuit board.

2. The continuous housing and integral user interface of claim 1, wherein the continuous housing comprises a single piece continuous housing that encompasses the electrical component.

3. The continuous housing and integral user interface of claim 1, wherein the continuous housing comprises a single piece extrusion element.

4. The continuous housing and integral user interface of claim 1, comprising a void, the void isolating the integral user interface portion from an adjacent continuous housing portion.

5. The continuous housing and integral user interface of claim 4, wherein the void having a void shape that defines an integral user interface shape.

6. The continuous housing and integral user interface of claim 5, wherein the void shape defines a key top of the integral user interface.

7. The continuous housing and integral user interface of claim 4, wherein the void shape defines a key top of the integral user interface.

8. The continuous housing and integral user interface of claim 6, wherein a plurality of key tops are formed by a single continuous void.

9. The continuous housing and integral user interface of claim 6, wherein a plurality of key tops are formed by a plurality of voids.

10. The continuous housing and integral user interface of claim 1, wherein the keypad backfill portion comprises a void filler portion.

11. The continuous housing and integral user interface of claim 1, wherein the keypad backfill is configured between a integral user interface inner surface and the keypad PCB.

12. The continuous housing and integral user interface of claim 1, wherein the keypad backfill portion is a light guide.

13. A continuous housing and integral user interface comprising:

a hollow profile single piece continuous housing having a first hollow profile, the profile formed by a first side, a second side, a third side, and a fourth side, the sides contiguous such that the first hollow profile is long in length in comparison to its cross sectional size, the first hollow profile including rails formed therein;

a first cavity opening of the housing and a second cavity opening housing; and a void incorporated into the continuous housing, the void forming a functional integral user interface component including a cantilever key.

14. The continuous housing and integral user interface of claim 13, wherein the functional integral user interface component comprises a cantilever key top portion formed by a void shape of the void.

15. The continuous housing and integral user interface of claim 13, a wedge plate to support and align a discrete keypad assembly.

* * * * *